(12) United States Patent
Kansal et al.

(10) Patent No.: US 9,332,411 B2
(45) Date of Patent: May 3, 2016

(54) USER INTERRUPTIBILITY AWARE NOTIFICATIONS

(71) Applicant: Microsoft Corporation, Redmond, WA (US)

(72) Inventors: Aman Kansal, Redmond, WA (US); Mohamed Musthag, Amherst, MA (US); Deepak Ganesan, Northampton, MA (US); Todd Mytkowicz, Seattle, WA (US); Kathryn Stuart McKinley, Hermosa Beach, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 13/771,106

(22) Filed: Feb. 20, 2013

(65) Prior Publication Data

US 2014/0235282 A1    Aug. 21, 2014

(51) Int. Cl.
H04W 4/00    (2009.01)
H04W 4/20    (2009.01)
H04W 4/02    (2009.01)

(52) U.S. Cl.
CPC ............... *H04W 4/20* (2013.01); *H04W 4/001* (2013.01); *H04W 4/028* (2013.01)

(58) Field of Classification Search
CPC ........... H04W 4/12; H04W 4/14; H04W 4/00; H04W 4/20; G06F 3/013; G06F 3/01; G06F 3/017; G06Q 10/107; G06Q 30/0242; G06Q 30/0251; G06Q 30/0272; G06Q 30/0277; H04N 13/0484; H04N 21/4882; H04N 21/812; H04N 21/84; H04N 21/4318
USPC .................................. 709/206, 207; 455/466
See application file for complete search history.

(56) References Cited

U.S. PATENT DOCUMENTS

| | | | |
|---|---|---|---|
| 6,078,310 A * | 6/2000 | Tognazzini | 345/158 |
| 6,618,716 B1 * | 9/2003 | Horvitz | G06F 9/4443 706/20 |
| 7,529,683 B2 | 5/2009 | Horvitz et al. | |
| 7,613,670 B2 | 11/2009 | Horvitz et al. | |
| 2002/0087649 A1 | 7/2002 | Horvitz | |
| 2004/0183749 A1* | 9/2004 | Vertegaal | 345/7 |

(Continued)

OTHER PUBLICATIONS

Fogarty, et al., "Predicting Human Interruptibility with Sensors", Retrieved at <<http://www.google.co.in/url?sa=t&rct=j&q=%22predicting%20human%20interruptibility%20with%20sensors%22&source=web&cd=1&cad=rja&ved=0CCcQFjAA&url=http%3A%2F%2Fciteseerx.ist.psu.edu%2Fviewdoc%2Fdownload%3Fdoi%3D10.1.1.78.9219%26rep%3Drep1%26type%3Dpdf&ei=uQSOUKeNEYztrQeEvoHwDQusg=AFQjCNFT5BIY5kYNB2Tg707LyQ1airRm9Q>>, ACM Transactions on Computer-Human Interaction, vol. 12, No. 1, Mar. 2005, pp. 119-146.

(Continued)

*Primary Examiner* — Allahyar Kasraian
(74) *Attorney, Agent, or Firm* — Steve Wight; Sandy Swain; Micky Minhas

(57) ABSTRACT

Various technologies described herein pertain to detection of an opportune time period to deliver a notification. Responsive to receipt of the notification (e.g., at a user device), analysis of an attention state of a user can be initialized. Further, the opportune time period to deliver the notification can be detected based on the analysis of the attention state of the user. The opportune time period can be during a breakpoint or an influential context. The breakpoint is when the user has switched between tasks and lacks engagement with the tasks. The influential context is a particular context in which the user is available to attend to the notification. Moreover, the notification can be delivered during the opportune time period.

20 Claims, 9 Drawing Sheets

(56) References Cited

U.S. PATENT DOCUMENTS

| | | | |
|---|---|---|---|
| 2012/0032806 A1* | 2/2012 | Lee | 340/573.1 |
| 2012/0148034 A1 | 6/2012 | Ferguson | |
| 2012/0295645 A1* | 11/2012 | Yariv et al. | 455/466 |
| 2013/0046612 A1* | 2/2013 | Prihodko et al. | 705/14.41 |
| 2013/0110949 A1* | 5/2013 | Maurel et al. | 709/206 |
| 2013/0132206 A1* | 5/2013 | Maurel et al. | 705/14.66 |
| 2013/0336111 A1* | 12/2013 | Vos et al. | 370/230 |
| 2014/0164531 A1* | 6/2014 | Bastide et al. | 709/206 |

OTHER PUBLICATIONS

Fogarty, James, "Sensor-Based Statistical Models of Human Interruptibility", Retrieved at <<http://homes.cs.washington.edu/~jfogarty/publications/workshop-ibmhcisymposium2004.pdf>>, IBM Research Human-Computer Interaction Symposium, Retrieved Date: Oct. 29, 2012, pp. 1-3.

Iqbal, et al., "Effects of Intelligent Notification Scheduling", Retrieved at <<https://www.ideals.illinois.edu/bitstream/handle/2142/11388/Effects%20of%20Intelligent%20Notification%20Scheduling.pdf>>, Retrieved Date: Oct. 29, 2012, pp. 1-10.

Vastenburg, et al., "Considerate Home Notification Systems: A User Study of Acceptability of Notifications in a Living Room Laboratory", Retrieved at <<http://citeseerx.ist.psu.edu/viewdoc/download?doi=10.1.1.151.3927&rep=rep1&type=pdf>>, International Journal of Human-Computer Studies 67 (2009), Jun. 23, 2009, pp. 1-19.

Czerwinski, et al., "A Diary Study of Task Switching and Interruptions", Retrieved at <<http://research.microsoft.com/en-us/um/people/horvitz/taskdiary.pdf>>, In Proceedings of the SIGCHI Conference on Human Factors in Computing Systems, Apr. 24, 2004, pp. 1-8.

Iqbal, et al., "Oasis: A Framework for Linking Notification Delivery to the Perceptual Structure of Goal-Directed Tasks", Retrieved at <<http://research.microsoft.com/pubs/147757/TOCHI-Oasis-final.pdf>>, In Journal of ACM Transactions on Computer-Human Interaction, vol. 17, Issue 4, Dec. 2010, pp. 1-27.

Isaacs, et al., "Mobile Microwaiting Moments: The Role of Context in Receptivity to Content While on the Go", Retrieved at <<http://www.izix.com/pubs/Isaacs-InfoOnTheGo-2009.pdf>>, In PARC White Paper, Retrieved Date: Oct. 29, 2012, pp. 1-10.

Kern, et al., "Towards Personalized Mobile Interruptibility Estimation", Retrieved at <<http://citeseerx.ist.psu.edu/viewdoc/download?doi=10.1.1.92.7742&rep=rep1&type=pdf>> In Proceedings of the Second International Conference on Location and Context-Awareness, May 10, 2006, pp. 1-17.

Knox, et al., "Towards Scatterbox: A Context-Aware Message Forwarding Platform", Retrieved at http://adrianclear.com/papers/clear_scat1.pdf>>, In Fourth International Workshop on Modeling and Reasoning in Context, Aug. 20, 2007, pp. 1-12.

Lim, et al., "Show Me a Good Time: Using Content to Provide Activity Awareness to Collaborators with ActivitySpotter", Retrieved at <<http://www.parc.com/content/attachments/show-me-good-time.pdf>>, In Proceedings of the 16th ACM International Conference on Supporting Group Work, Nov. 7, 2010, pp. 263-272.

Streefkerk, et al., "Balancing Awareness and Interruption in Mobile Patrol Using Context-Aware Notification", Retrieved at <<http://people.cs.vt.edu/~mccricks/papers/Streefkerk_IJMHCI12.pdf>>, In International Journal of Mobile Human Computer Interaction, vol. 4, Issue 3, Retrieved Date: Oct. 29, 2012, pp. 1-28.

Weber, et al., "Multi-format Notifications for Multi-tasking", Retrieved at <<http://mwnewman.people.si.umich.edu/pubs/interact09-notifications.pdf>>, In Proceedings of the 12th IFIP TC 13 International Conference on Human-Computer Interaction, Aug. 24, 2009, pp. 1-14.

Zulkernain, et al., "A Context-Aware Cost of Interruption Model for Mobile Devices", Retrieved at http://ieeexplore.ieee.org/stamp/stamp.jsp?tp=&arnumber=5766933, In IEEE International Conference on Pervasive Computing and Communications Workshops, Mar. 21, 2011, pp. 456-460.

Zulkernain, et al., "A Mobile Intelligent Interruption Management System", Retrieved at <<http://www.jucs.org/jucs_16_15/a_mobile_intelligent_interruption/jucs_16_15_2060_2080_zulkernain.pdf>>, In Journal of Universal Computer Science, vol. 16, Issue 15, 2010, pp. 2060-2080.

* cited by examiner

USER INTERRUPTIBILITY AWARE NOTIFICATIONS

BACKGROUND

Computing devices have become ubiquitous in society. With the increased exposure to computing devices, users have greater access to information. However, depending upon how the information is presented, such computing devices can distract users when focused on other tasks or users may ignore the information presented via such computing devices due their attention being focused on the other tasks.

Users oftentimes receive notifications about information of interest. Receipt of notifications about the information of interest can be more convenient for users as compared to manually visiting sources of such information. For example, suppose a user is waiting for a shipment to be delivered at a company warehouse, while the user is away at a corporate office. Instead of the user periodically checking the website of the shipping company for a delivery status, it can be more convenient if the user receives a notification pertaining to the delivery status on a mobile device or another user device. The notification, for instance, can be a Short Message Service (SMS) message, a phone call, a page, a mobile push notification, or the like.

However, notifications can be disruptive to users depending upon attention states of the users. As an illustration, a notification can disrupt a user if the notification arrives while the user is busy in a meeting, driving, focused on an intellectual task, or otherwise unavailable to accept the notification. When notifications from multiple notification senders that are relevant to the user are considered as a whole, the total disruption from the notifications can be significantly detrimental to productivity of the user.

From the perspective of a notification sender, some notifications such as product promotions can provide benefits to the notification senders so long as receivers accept such notifications. For instance, a notification can be accepted by a user clicking on a mobile alert, answering a phone call, or the like. Accordingly, if the user is unavailable to accept the notification, the notification sender may not obtain the benefit associated with the notification.

SUMMARY

Described herein are various technologies that pertain to detection of an opportune time period to deliver a notification. Responsive to receipt of the notification (e.g., at a user device), analysis of an attention state of a user can be initialized. Further, the opportune time period to deliver the notification can be detected based on the analysis of the attention state of the user. The opportune time period can be during a breakpoint or an influential context. The breakpoint is when the user has switched between tasks and lacks engagement with the tasks. The influential context is a particular context in which the user is available to attend to the notification. Moreover, the notification can be delivered during the opportune time period. Alternatively, it is contemplated that under various conditions the notification may not be delivered (e.g., the user device is off and the opportune time period expires, the user blocks notifications, etc.).

According to various embodiments, the user device can be a mobile device. The mobile device can receive the notification transmitted from a notification sender. Responsive to receipt of the notification at the mobile device, the analysis of the attention state of the user can be initiated; thus, the mobile device may not be analyzing the attention state of the user prior to receipt of the notification, thereby enabling resources (e.g., battery life, processor cycles, etc.) of the mobile device to be conserved. Further, the opportune time period to deliver the notification can be detected based on the analysis of the attention state of the user. Data from various information sources can be evaluated as part of the analysis of the attention state of the user. Examples of the information sources include sensors (e.g., of the mobile device), online services, device usage, usage of software applications, and so forth. The data from the information sources used to analyze the attention state of the user, for instance, can relate to history, predictions, context (e.g., location, search history), calendar, contact lists, and so forth. History can include whether the user interacts with and/or reacts to previous notification(s) (e.g., selects, reads, and/or acts on the previous notification(s)). Moreover, a type of notification can be considered when detecting the opportune time period to deliver the notification (e.g., whether the user is subscribed to a service that sends the notification, whether the notification sender is proactive, for instance, by learning the user's likes, etc.).

In accordance with various embodiments, a notification distribution system (e.g., a notification distribution server) can receive the notification from the notification sender. The notification distribution system can delay the notification if determined to be delay tolerant. Further, the notification distribution system can detect an upcoming opportune time period for a user device to deliver the notification, where the upcoming opportune time period is during a breakpoint or an influential context. Moreover, the notification distribution system can send the notification to the user device as the upcoming opportune time period approaches. The user device can receive the notification, and thereafter can deliver the notification (e.g., during the opportune time period detected by the user device).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
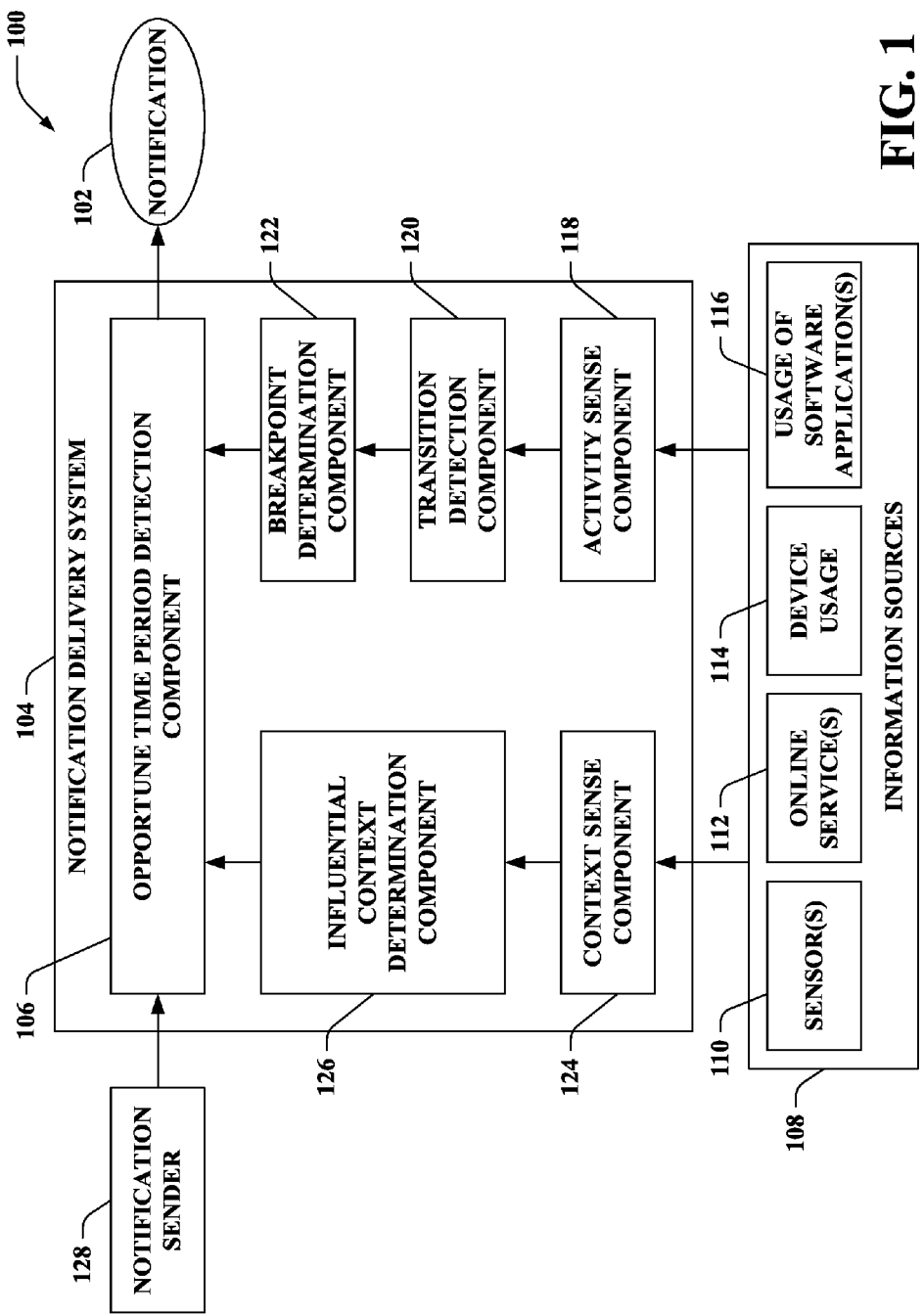
FIG. 1 illustrates a functional block diagram of an exemplary system that detects an opportune time period to deliver a notification.

Various technologies pertaining to detecting an opportune time period to deliver a notification based on an attention state of a user are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, an opportune time period to deliver a notification can be detected. Responsive to receipt of the notification (e.g., at a user device), analysis of an attention state of a user can be initialized. Further, the opportune time period to deliver the notification can be detected based on the analysis of the attention state of the user. The opportune time period can be during a breakpoint or an influential context, where the breakpoint is when the user has switched between tasks and lacks engagement with the tasks, and the influential context is a particular context in which the user is available to attend to the notification. Moreover, the notification can be delivered during the opportune time period.

Referring now to the drawings, FIG. 1 illustrates a system 100 that detects an opportune time period to deliver a notification 102. The system 100 can control timing of the delivery of the notification 102 to mitigate user disruption. The system 100 includes a notification delivery system 104 that receives the notification 102 transmitted from a notification sender 128. Although not shown, it is contemplated that the notification 102 can be received from a notification distribution system (e.g., notification distribution server, backend server); thus, the notification distribution system can receive the notification 102 from the notification sender 128 and can thereafter send the notification to the notification delivery system 104 (or a plurality of notification delivery systems). While many of the examples set forth herein pertain to delivery of one notification (e.g., the notification 102), it is contemplated that more than one notification (transmitted from one or more notifications senders) can be received and delivered by the notification delivery system 104.

The notification delivery system 104 can be included in a user device (not shown). Examples of the user device include, but are not limited to, a mobile device (e.g., smartphone, etc.), a videogame console, a television, a computing device (e.g., personal computer, laptop computer, tablet, etc.), a home automation device (e.g., thermostat, lighting control device, security device, intercom, etc.), a household appliance (e.g., refrigerator, microwave, dishwasher, oven, range, washing machine, dryer, water heater, etc.), or the like.

Responsive to receipt of the notification 102, the notification delivery system 104 can initialize analysis of an attention state of a user. According to an example where the notification delivery system 104 is included in a mobile device, the notification delivery system 104 can initialize analysis of the attention state of the user responsive to receipt of the notification 102 at the mobile device. Pursuant to this example, the notification delivery system 104 may not be analyzing the attention state of the user prior to receipt of the notification 102 at the mobile device. Accordingly, usage of a battery of the mobile device can be reduced (e.g., energy efficiency of the mobile device can be enhanced) as compared to conventional approaches that continuously or periodically monitor an attention state of a user.

It is contemplated that coarse-grained user state information can be obtained prior to receipt of the notification 102. By way of illustration, a user device that includes the notification delivery system 104 can sense the coarse-grained user state information prior to receipt of the notification 102; following this illustration, responsive to receipt of the notification 102, the analysis of the attention state of the user can be initialized, where at least a portion of the analysis may be based on the coarse-grained user state information obtained prior to receipt of the notification 102. An example of the coarse-grained user state information that can be obtained prior to receipt of the notification 102 includes sensing a location of the user (e.g., whether the user is home, at work, etc.). It is to be appreciated that some coarse-grained user state information may be available prior to receipt of the notification 102, but become unavailable at the time of receipt of the notification 102. For instance, Global Positioning System (GPS) data can be available outdoors, and thus, can be sensed when a user arrives home; however, once indoors, the GPS data may be unable to be sensed (e.g., such data may not be able to be sensed upon receipt of the notification 102 when the user is indoors).

The notification delivery system 104 includes an opportune time period detection component 106 that detects the opportune time period to deliver the notification 102 based on the analysis of the attention state of the user. The opportune time period can be during a breakpoint and/or when the user is in an influential context. As used herein, a breakpoint refers to a time period when a user has switched between tasks and lacks engagement with the tasks. Further, as used herein, an influential context refers to a particular context of a user in which the user is available to attend to a notification.

Further, the notification delivery system 104 can deliver the notification 102 during the opportune time period detected by the opportune time period detection component 106. It is contemplated that the notification 102 can be delivered via a display, speaker, light, vibration component, combination thereof, etc. of (or in communication with) the user device that includes the notification delivery system 104. Alternatively, it is contemplated that under various conditions the notification may not be delivered (e.g., the user device is off and the opportune time period expires, the user blocks notifications, etc.).

The notification delivery system 104 can deliver the notification 102 when the user is likely to be available for such notification 102. The user can likely be available for the notification 102 when not deeply engaged in a task, but rather when switching between two tasks (e.g., during a breakpoint). Further, the user can likely be available for the notification 102 when not in certain contexts and activities where the user encounters difficulty to attend to notifications, but rather when in other contexts when the user is typically available to attend to the notification 102 (e.g., in an influential context). Examples of contexts where it is difficult for a user to attend to a notification include when the user is driving, in a meeting, or performing an intellectual task; however, the claimed subject matter is not so limited.

The notification delivery system 104 can detect a breakpoint and/or an influential context. Moreover, the opportune time period detection component 106 can detect the opportune time period to deliver the notification 102 based on the breakpoint or the influential context as detected. The notification delivery system 104 can analyze the attention state of the user by evaluating data from one or more information sources 108. The one or more information sources 108 can include data about the user, which can be leveraged to infer breakpoints and influential contexts for the user.

The information sources 108 can include sensor(s) 110, online service(s) 112, device usage 114 and/or usage of software application(s) 116. For instance, the sensor(s) 110 can be included in or coupled with the user device that includes the notification delivery system 104; however, the claimed subject matter is not so limited. Examples of the sensor(s) 110 include a microphone, an accelerometer, a gyroscope, a camera, a location detection component, a combination thereof, or the like. The online service(s) 112 can include, for example, email, calendar, social networks, games, and so forth. In accordance with an exemplary scenario, the online service(s) 112 can provide data related to whether the user is scheduled to be in a meeting. By way of another exemplary scenario, the online service(s) 112 can provide data that indicates whether the user is actively using the online service(s) 112. It is to be appreciated, however, that other data can be provided by the online service(s) 112; thus, the claimed subject matter is not limited to the foregoing exemplary scenarios. Examples of data related to the device usage 114 that can be provided include whether keys are pressed on the keyboard, input is received via a mouse, touchscreen, touchpad, etc., or whether a gesture, voice, etc. is detected. Further, data related to the usage of the software application(s) 116 can indicate information such as whether the user is typing an email, using a teleconference system, and so forth. The data related to the usage of the software application(s) 116 can also indicate a switch from a first software application to a second software application. It is contemplated, however, that the information sources 108 that supply data to the notification delivery system 104 can include other information source(s) and/or a subset of the above-noted information sources. Moreover, different user devices can have access to differing information sources 108.

The data from the information sources 108 used to analyze the attention state of the user, for instance, can relate to history, predictions, context (e.g., location, search history), calendar, contact lists, and so forth. History can include whether the user interacts with and/or reacts to previous notification(s) (e.g., selects, reads, and/or acts on the previous notification(s)). Moreover, a type of the notification 102 can be considered when the opportune time period detection component 106 detects the opportune time period to deliver the notification 102 (e.g., whether the user is subscribed to a service that sends the notification 102, whether the notification sender 128 is proactive, for instance, by learning the user's likes, etc.). According to another example, it is contemplated that the opportune time period detection component 106 can determine the opportune time period for the notification 102 based upon a static plan (e.g., deliver the notification 102 around 5:00 pm when the user is typically available to receive notifications) and/or reactively; however, the claimed subject matter is not so limited.

While the user device that includes the notification delivery system 104 can obtain the data from the online service(s) 112, it is also contemplated that the data from the online service(s) 112 can be available to other devices without such other devices connecting to the user device. For example, a notification distribution system can access the data from the online service(s) 112 without connecting to the user device that includes the notification delivery system 104. Accordingly, the data from the online service(s) 112 can be employed by the notification distribution system without using resources of the user device (e.g., without draining a battery of a user device).

The notification delivery system 104 can analyze data from the sensor(s) 110, data from the online service(s) 112, data related to the device usage 114 and/or data related to the usage of software application(s) 116. By way of example, the data related to device usage 114 can include data from at least one disparate user device (a user device other than the user device that includes the notification delivery system 104). Following this example, data related to a disparate user device can be utilized to evaluate the attention state of the user (in addition to or instead of data related to the user device that includes the notification delivery system 104 and/or data from other information sources 108). Hence, data from multiple user devices can be integrated to enhance detection of the opportune time period to deliver the notification 102. Yet, it is contemplated that the claimed subject matter is not limited to the foregoing example.

The data provided by the information sources 108 can be in a raw form, which may not be directly useful to the opportune time period detection component 106. Accordingly, the notification delivery system 104 can implement various data processing techniques that convert the raw data from the information sources 108 into forms that are indicative of breakpoints or influential contexts. These techniques are set forth below.

The notification delivery system 104 can include an activity sense component 118, a transition detection component 120, and a breakpoint determination component 122 that detect breakpoints based on the analysis of the attention state of the user. The activity sense component 118 can infer activities of the user based on the data from the one or more information sources 108. Moreover, the transition detection component 120 can detect transitions between the activities. Further, the breakpoint determination component 122 can infer a breakpoint based upon the transitions.

The activity sense component 118 can infer the activities from raw data from the sensor(s) 110 and/or other sources included in the information sources 108. Examples of activities that can be detected by the activity sense component 118 include whether the user is walking, driving, not moving, in a meeting, or the like. For instance, the activity sense component 118 can infer that the user is in a meeting based upon presence of human voice (e.g., detected by a microphone of the user device); thus, the activity sense component 118 can process raw microphone data to infer whether human voice is present. By way of another example, the activity sense component 118 can process raw microphone data to determine other attendees of the meeting (e.g., infer whose voice is present in the raw microphone data); following this example, the activity sense component 118 can distinguish whether the user is meeting with her supervisor or a family member. According to another example, the activity sense component 118 can convert accelerometer data and/or gyroscope data to movement activity. The claimed subject matter, however, is not limited to the foregoing examples; rather, it is to be appreciated that the activity sense component 118 can infer other activities from the information sources 108.

The transition detection component 120 can process the activity outputs from the activity sense component 118 to detect time instances where the activity changes from a first state to a second state. An example of a change in activity is a transition from sitting to walking; however, the claimed subject matter is not so limited. It is noted that activity sensing techniques commonly have some noise and may detect movement when a user is not moving. Moreover, various activities sometimes include multiple transitions; for instance, being in a meeting can include durations of time when human voice is present and other durations of time that lack human voice (e.g., silent moments between words and sentences, even when the same person is speaking). Accordingly, the number of transitions detected by the transition detection component 120 may lack correspondence to breakpoints between user tasks. The transitions determined by the transition detection component 120 can be utilized as input to the breakpoint determination component 122.

The breakpoint determination component 122 can infer the breakpoint based upon the transitions determined by the transition detection component 120. More particularly, the breakpoint determination component 122 can apply a low pass filter to the transitions to suppress rapid transitions and generate a smoothed sequence of transitions. Further, the breakpoint determination component 122 can select the breakpoint from the smoothed sequence of transitions based upon a previously learned set of transition sequences that correspond to breakpoints. Accordingly, the breakpoint determination component 122 can infer meaningful breakpoints from the transitions detected by the transition detection component 120. Examples of meaningful breakpoints include an end of a driving task or a start of the meeting; yet, the claimed subject matter is not so limited.

It is contemplated that the breakpoint determination component 122 can apply various low pass filtering techniques to suppress the rapid transitions and generate the smoothed sequence of transitions. Examples of rapid transitions include pauses within a duration of speech or stopping at a stop light while driving. By way of illustration, the breakpoint determination component 122 can smooth the rapid transitions by considering a time window and classifying such time window as being in a particular state based on a majority count of which state dominates the time window. Accordingly, if a first state dominates a time window, then multiple small instances of a second state within the time window can be suppressed by the breakpoint determination component 122.

As noted above, the breakpoint determination component 122 can further select the breakpoint from the smoothed sequence of transitions. For instance, initiation of driving may not be a useful breakpoint (e.g., since the user is unlikely to be able to attend to a notification received while driving), while an end of driving can be a useful breakpoint. According to another example, a sequence of transitions such as a meeting followed by walking, followed by sitting down may indicate that a user has returned from a meeting to her office and now may be available for the notification 102.

The breakpoint determination component 122 can identify the breakpoint based on a previously learned set of transition sequences that correspond to breakpoints. For instance, the previously learned set of transition sequences that correspond to breakpoints can be based on user data collected at design time. The previously learned set of transition sequences that correspond to breakpoints can additionally be based on training data collected at run time. Training data can be collected at run time through various active learning techniques and can be employed to enhance the training and identification of breakpoints by the breakpoint determination component 122. The user data collected at design time and/or the training data collected at run time can include data pertaining to actions users take on receipt of notifications, for instance.

Moreover, the notification delivery system 104 can include a context sense component 124 and an influential context determination component 126 that detect the influential context based on the analysis of the attention state of the user. The context sense component 124 can sense a context of the user based on the data from the one or more information sources 108. Further, the influential context determination component 126 can identify whether the context is an influential context.

The context sense component 124, for example, can detect whether the user is at home, riding a bus, at the mall, at work, and so forth. A large number of contexts can be sensed by the context sense component 124 using the data about the user from the information sources 108. Moreover, the influential context determination component 126 can select a subset of the contexts that are influential for determining whether the user is available to receive the notification 102.

The influential context determination component 126 can identify whether a context is influential in determining interruptibility based on design time learning, run time learning with user feedback and/or table lookup. For instance, the influential context determination component 126 can identify whether the context is an influential context based on preferences collected over a set of training users at design time. Thus, the preferences collected over the set of training users can be employed to determine which contexts are preferred for receiving notifications. Additionally or alternatively, the influential context determination component 126 can identify whether the context is an influential context based upon preferences of the user learned through behavior monitoring at run time. The preferences of the user can be learned based at least in part on history data that comprises data pertaining to actions of the user responsive to previously received notifications. Thus, enhancements and customizations to a particular user's tastes can be provided through active learning and behavior monitoring at run time. By way of another example, the influential context determination component 126 can identify whether the context is an influential context based upon rules included in a lookup table. Following this example, when training data is unavailable, a rule-based lookup table can be employed by the influential context determination component 126 to determine whether the context is an influential context.

The opportune time period detection component 106 can select the opportune time period to deliver the notification 102, where the opportune time period is during the breakpoint and/or the influential context as detected. For instance, each breakpoint and influential context can be assigned an availability score based on a training phase. Moreover, the notification 102 can be assigned a priority score. The priority score can be based on the content of the notification and an assigned value of the user. The assigned value of the user can be collected during a training phase, based on past click or acceptance patterns, and so forth. Further, the priority score can be based on an assigned value of the notification sender 128.

Moreover, the opportune time period detection component 106 can determine a delay bound for delivery of the notification 102 upon receiving the notification (e.g. at the user device). If not delivered prior, the opportune time period detection component 106 can deliver the notification 102 upon expiration of the delay bound for the delivery of the notification 102 regardless whether during the opportune time period. The delay bound on the delivery of the notification 102 may be specified by the notification sender 128, inferred from the content of the notification 102 (e.g., a notification that indicates arrival of a bus in 10 minutes is to be delivered within 5 minutes, etc.), determined based on default rules for the notification delivery system 104 (e.g., a notification that indicates a flight delay is to be delivered within 10 minutes of receipt, a notification for a lunch coupon can be delayed until a next mealtime, etc.), and so forth.

Moreover, the opportune time period detection component 106 can match the notification 102 to the opportune time period based upon a characteristic of the notification 102. The characteristic of the notification 102 can include content of the notification 102, a subject of the notification 102, and the like. Thus, the notification 102 can be delivered during the opportune time period to which the notification 102 is matched. According to an illustration, the notification 102 may be a message from a user's wife asking the user to pick up milk on the way home from work. Following this illustration, if the opportune time period is detected at 5:00 pm, then the opportune time period detection component 106 can match the message from the user's wife to such opportune time period, thereby causing the notification delivery system 104 to deliver the message from the user's wife. By way of another illustration, location information (e.g., from one or more of the information sources 108) can provide indications concerning notifications to deliver to the user.

The opportune time period detection component 106 can further select the opportune time period to deliver the notification 102 based upon user preferences, for example. The user preferences can be discerned, for instance, based upon address books and subscriptions; thus, preferred notifications can be determined from the user preferences, and delivery by the opportune time period detection component 106 can differ for the preferred notifications versus other types of notifications. Moreover, the user preferences can specify user priorities on notifications.

Figure 2:
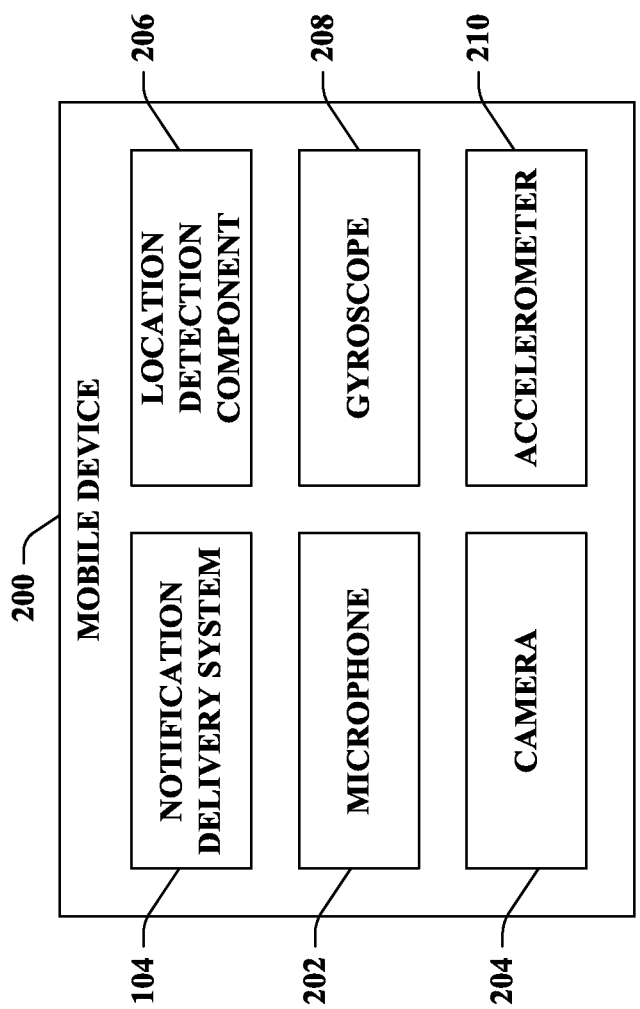
FIG. 2 illustrates an exemplary mobile device that includes a notification delivery system of FIG. 1 and various sensors.

With reference to FIG. 2, illustrated is an exemplary mobile device 200 that includes the notification delivery system 104 and various sensors. As depicted, the mobile device 200 can include a microphone 202, a camera 204, a location detection component 206, a gyroscope 208, and an accelerometer 210. The location detection component 206, for instance, can use GPS, Wi-Fi, a combination thereof, or the like to detect a location of the mobile device 200. The microphone 202, the camera 204, the location detection component 206, the gyroscope 208, and the accelerometer 210, for instance, can be at least a subset of the sensor(s) 110 included in the information sources 108 of FIG. 1.

The notification delivery system 104 can detect opportune time periods (e.g., interruptible moments) for the user based on user activity and context states sensed using the mobile device 200. For instance, the notification delivery system 104 can detect opportune time periods based on use of the microphone 202, the camera 204, the location detection component 206, the gyroscope 208, and/or the accelerometer 210. Moreover, it is contemplated that other types of sensors (not shown) of the mobile device 200 are intended to fall within the scope of the hereto appended claims, and such other types of sensors can similarly be utilized by the notification delivery system 104. Moreover, it is to be appreciated that the mobile device 200 can lack one or more of the sensors depicted in FIG. 2.

Figure 3:
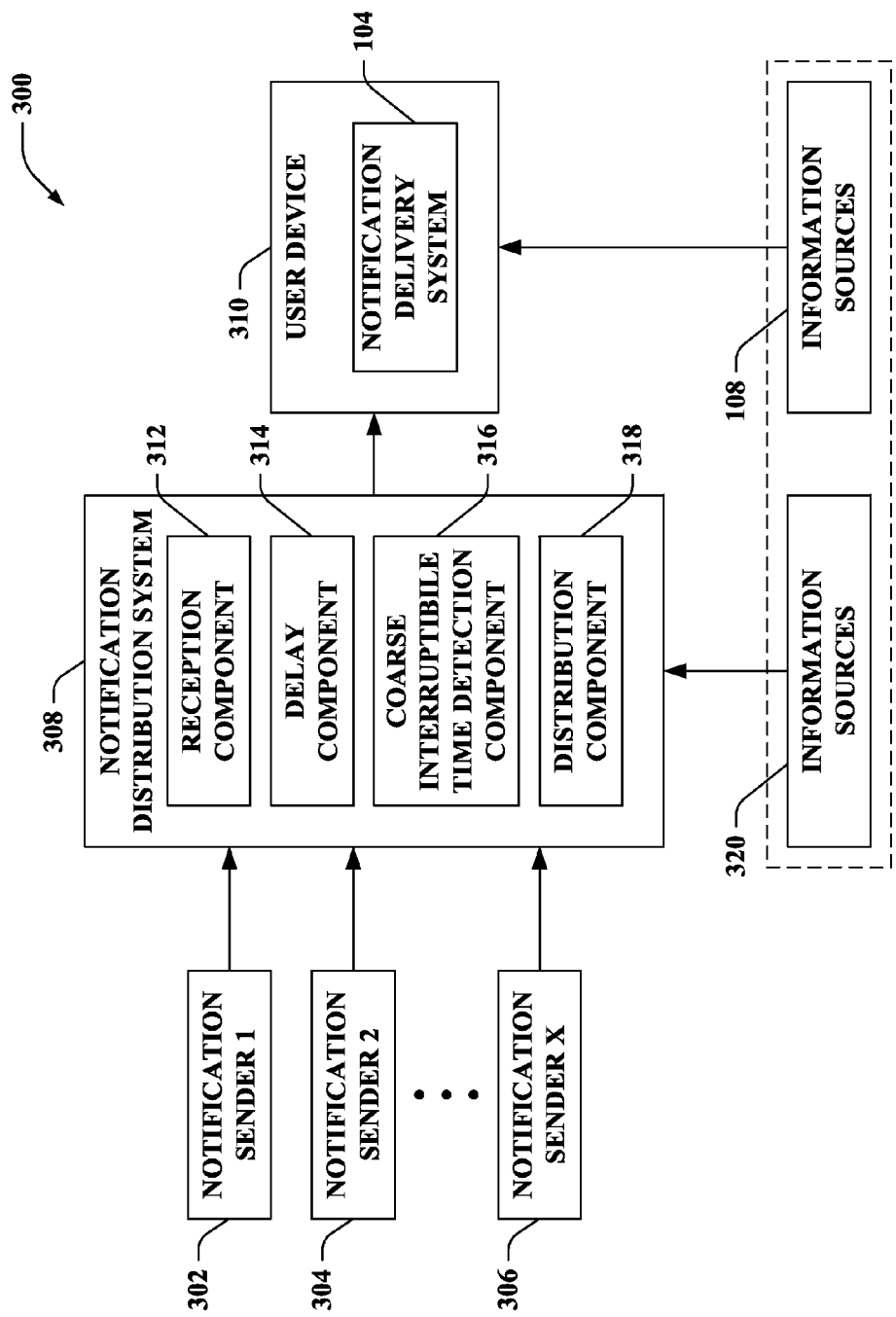
FIG. 3 illustrates a functional block diagram of an exemplary system that separates an inference task for detecting opportune time periods to deliver notifications to users.

Turning to FIG. 3, illustrated is a system 300 that separates an inference task for detecting opportune time periods to deliver notifications to users. The system 300 includes a plurality of notification senders, namely, a notification sender 1 302, a notification sender to 2 304, ..., and a notification sender X 306 (collectively referred to herein as notification senders 302-306), where X can be substantially any integer. For instance, the notification sender 128 of FIG. 1 can be one of the notification senders 302-306. The notification senders 302-306 can include online service provider(s) such as an email provider, a news provider, a social network provider, an entertainment provider, a game provider, an online store, etc.; it is to be appreciated, however, that the claimed subject matter is not limited to the foregoing exemplary notification senders. Further, the notification senders 302-306 can send SMS messages, emails, status updates, phone calls, pages, mobile push notifications, and so forth. According to an example, there may be differing classes of notifications sent by the notification senders 302-306. For instance, the classes can be learned, determined based upon registration, determined as a function of contacts in a contact list, etc. By way of illustration, a class of notifications can be a blocked class (e.g., block phone calls not in an approved whitelist, etc.); yet, the claimed subject matter is not so limited.

Moreover, the system 300 includes a notification distribution system 308 (e.g., notification distribution server, back-end server, cloud-based server, etc.) and a user device 310. According to various examples (not shown), it is contemplated that the notification distribution system 308 can include one or more of the notification senders 302-306; yet, the claimed subject matter is not so limited. The user device 310, for example, can be a mobile device, a videogame console, a television, a computing device, a household appliance, a home automation device, or the like. The user device 310 can further include the notification delivery system 104.

The notification distribution system 308 and the user device 310 can detect an opportune time period to notify a user. More particularly, the notification distribution system 308 and the user device 310 can split the task of detecting the opportune time period to notify the user, thereby providing enhanced energy efficiency for the user device 310.

The notification distribution system 308 can delay sending a notification to the user device 310. Further, the user device 310 (e.g., the notification delivery system 104) can initialize analysis of the attention state of the user upon receipt of the notification. Accordingly, by delaying the notification, battery usage of the user device 310 associated with detecting the opportune time to deliver the notification can be reduced.

The notification distribution system 308 includes a reception component 312 that receives a notification transmitted from a notification sender (e.g., one of the notification senders 302-306), where the notification can be for a user. Further, although not discussed below, it is contemplated that the reception component 312 can receive additional notification(s) transmitted from one of more of the notification senders 302-306. The additional notification(s) can be similarly distributed as set forth below.

The notification distribution system 308 further includes a delay component 314 that determines whether the notification is delay tolerant. The delay component 314 can delay delivery of the notification if the notification is determined to be delay tolerant. For instance, the notification can be collected in a queue (with other delay tolerant notifications) if the notification is determined to be delay tolerant. Alternatively, if the delay component 314 determines that the notification is not delay tolerant, then the notification can be sent to the user device 310 responsive to receipt by the reception component 312.

The notification distribution system 308 can further include a coarse interruptible time detection component 316 that detects an upcoming opportune time period for the user device 310 to deliver the notification. The upcoming opportune time period is during a breakpoint or an influential context. The coarse interruptible time detection component 316 can detect the upcoming opportune time period for the user device 310 to deliver the notification based on data from one or more information sources 320.

For example, the information sources 320 to which the notification distribution system 308 has access can be a subset of the information sources 108 to which the user device 310 has access. The data from the one or more information sources 320 analyzed by the coarse interruptible data detection component 316, for instance, can include data from online service(s) (e.g., the online service(s) 112). However, it is to be appreciated that other information sources can supply data in addition to the online services.

By way of example, the coarse interruptible time detection component 316 can detect the upcoming opportune time period for the user device 310 to deliver the notification without the notification distribution system 308 connecting to the user device 310. In accordance with this example, the notification distribution system 308 can obtain data from the online service(s) (e.g., the information sources 320), and such data can be utilized by the coarse interruptible time detection component 316 to determine if the opportune time period is likely to be upcoming. The data from the online service(s) can pertain to a user's engagement with such online service(s), last known location, calendar and meeting schedule, and the like.

The coarse interruptible time detection component 316 can sense a context of the user based on the data from the one or more information sources 320. Moreover, the coarse interruptible time detection component 316 can identify whether the context is an influential context based upon preferences collected over a set of training users, preferences of the user learned through behavior monitoring at run time based at least in part on history data that comprises data pertaining to actions of the user responsive to previously received notifications, rules included in a lookup table, a combination thereof, and so forth. Additionally or alternatively, the coarse interruptible time detection component 316 can predict the breakpoint based on the data from the one or more information sources 320.

It is contemplated that the influential context inference executed by the coarse interruptible time detection component 316 can be substantially similar to such inference executed by the notification delivery system 104 of the user device 310. For instance, such determination of the influential contexts can be based on partial data about the user from online service(s), which can be available to both the notification distribution system 308 and the user device 310 (e.g., the information sources 108 and the information sources 320 can both include the online service(s) 112). Further, it is contemplated that the notification distribution system 308 and the user device 310 can exchange data as needed; yet, the claimed subject matter is not so limited.

Moreover, the notification distribution system 308 includes a distribution component 318 that sends the notification to the user device 310 (or a plurality of user devices). For instance, the distribution component 318 can send the notification to the user device 310 as the upcoming opportune time period approaches. By way of another example, if the delay component 314 determines that the notification is not delay tolerant, then the distribution component 318 can send the notification to the user device 310 responsive to receipt of the notification by the reception component 312. In accordance with another example, if the notification distribution system 308 lacks data for determining the upcoming opportune time period for the user device 310 to deliver the notification, then the distribution component 318 can send the notification to the user device 310 responsive to receipt of the notification by the reception component 312.

The user device 310 can receive the notification from the notification distribution system 308. Moreover, the notification received by the user device 310 can be delayed by the notification distribution system 308 (e.g., the delay component 314). For instance, the user device 310 can receive the notification from the notification distribution system 308 as the opportune time period approaches.

The user device 310 need not deliver the notification upon receipt of the notification from the notification distribution system 308; rather, subject to the delay limit for the notification, the notification delivery system 104 of the user device 310 can enable detecting the opportune time period to deliver the notification. The user device 310, for instance, may have coarse-grained data about the user state based on past sensing. After having received the notification from the notification distribution system 308 and based on the past estimate of the user state, the notification delivery system 104 can initiate analysis of the attention state of the user to detect a next breakpoint or influential context as described herein. Moreover, the notification can be delivered to the user during such breakpoint or influential context or when the delay limit on the notification expires.

Figure 4:
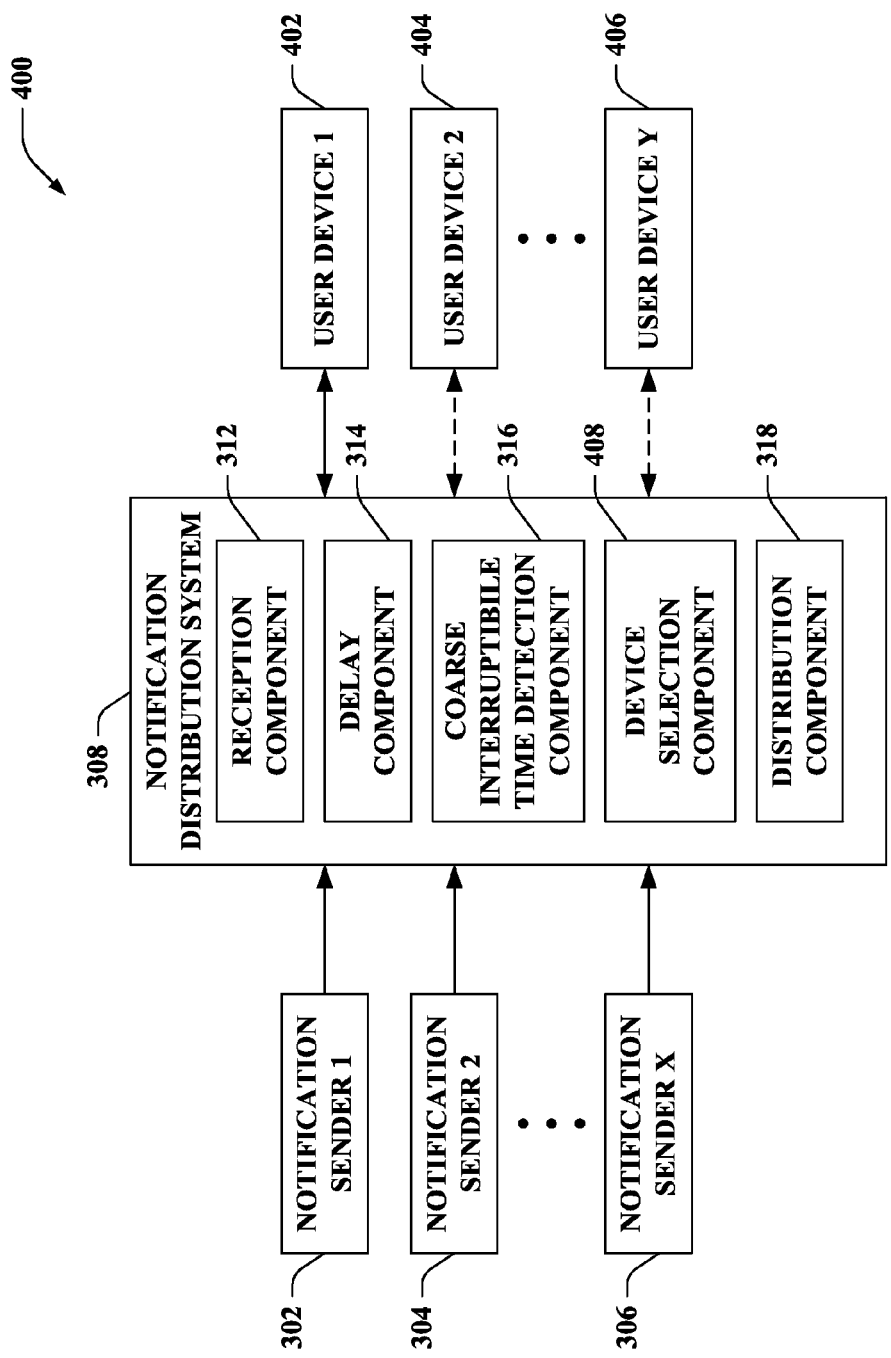
FIG. 4 illustrates a functional block diagram of an exemplary system that delivers a notification via a selected user device during an opportune time period.

Referring now to FIG. 4, illustrated is a system 400 that delivers a notification via a selected user device during an opportune time period. The system 400 includes the notification senders 302-306 and the notification distribution system 308. The system 400 further includes a user device 1 402, a user device 2 404, . . . , and a user device Y 406 (collectively referred to herein as user devices 402-406), where Y can be substantially any integer. For instance, the mobile device 200 of FIG. 2 can be one of the user devices 402-406 and/or the user device 310 of FIG. 3 can be one of the user devices 402-406.

As described herein, the notification distribution system 308 can include the reception component 312, the delay component 314, the coarse interruptible time detection component 316, and the distribution component 318. The notification distribution system 308 can further include a device selection component 408 that chooses a user device from the set of user devices 402-406 based on predicted usages of the user devices 402-406 in the set. Accordingly, the device selection component 408 can determine an appropriate device (or devices) for notification delivery.

A user often has multiple user devices 402-406 within vicinity. For instance, in an office setting, the user may be working on a personal computer while nearby having a smartphone and a laptop. According to another example, in a home setting, the user may be watching a television, browsing for show related information on a tablet computer, and have a smartphone in her pocket. Notifications such as alerts about email arrival are conventionally delivered on more than one device of the user. However, delivery of the notification on multiple user devices 402-406 can annoy the user and/or be wasteful of limited resources of the user devices 402-406 (e.g., battery life, processor cycles, screen real estate, etc.).

In contrast, the device selection component 408 can select a user device (e.g., the user device 1 402) from the user devices 402-406 based on a prediction that such user device is in use by the user. For instance, each user device 402-406 can send usage status information to the notification distribution system 308. The usage status information, for example, can pertain to whether a user device (e.g., the user devices 402-406) is powered on, connected to an electrical outlet (e.g., it may be more energy efficient to send a notification to a user device connected to an electrical outlet as compared to a user device disconnected from an electrical outlet), etc. According to another example, a personal computer may send information every t minutes concerning a length of time that has passed since the user last touched an input device (e.g., keyboard, mouse, touchpad, touchscreen, etc.) of the personal computer. Various techniques can be utilized to convey such usage information from the user devices 402-406 to the notification distribution system 308. Based on long-term data concerning usage received at the notification distribution system 308, the device selection component 408 can apply machine learning to predict the probability of which user device from the user devices 402-406 will be in use during the upcoming opportune time period. If a particular user device is known to be in use or sufficient training data about user behavior is available, the prediction can have a confidence above a threshold. In such cases where the prediction confidence is above the threshold, the notification can be sent by the distribution component 318 to the particular user device with which the user is predicted to be engaged. Alternatively, if no user device has a prediction confidence above the threshold, then the distribution component 318 can send the notification to multiple user devices 402-406 (e.g., two or more of the user devices 402-406).

Further, it is contemplated that the user and/or a notification (e.g., type or class of notification, based upon the notification sender from the notification senders 302-306, etc.) can have a preferred user device(s) from the user devices 402-406. Thus, the device selection component 408 can determine the appropriate device (or devices) for notification delivery based upon such preferences. By way of illustration, the user can prefer that notifications be delivered to her laptop rather than her phone when at work; accordingly, the device selection component 408 can choose to distribute notification(s) to the user's laptop instead of her phone when she is identified as being at work.

Many possible notification senders 302-306 can send notifications. The notifications arrive at the notification distribution system 308, which can further send such notifications to the user devices 402-406. The example set forth in FIG. 4 shows the notification senders 302-306 and the user devices 402-406 being connected to a single notification distribution system (e.g., the notification distribution system 308). However, it is contemplated that a subset of the user devices 402-406 may be connected to a first notification distribution system and a disparate subset of the user devices 402-406 can be connected to a second notification distribution system. By way of illustration, a mobile device may be connected to a phone company's notification distribution system, while a television can be connected to a cable company's notification distribution system.

In accordance with the scenario where subsets of the user devices 402-406 are connected to differing notification distribution systems, the differing notification distribution systems may be connected to a common coordination server (not shown). However, if connections to a common coordination server are not permitted, then each notification distribution system may separately operate as described herein. Yet, the separate operation of the notification distribution systems can result in some loss of efficiency.

Although not shown, it is contemplated that the user devices 402-406 (or a subset thereof) can include respective notification delivery systems (e.g., the notification delivery system 104). According to an example, a first subset of the user devices 402-406 (e.g., with rich sensing) can implement the opportune time detection functionality as set forth herein, a second subset of the user devices 402-406 may implement a portion of the opportune time detection functionality described herein, and a third subset of the user devices 402-406 may implement none of the opportune time detection functionality described herein. Following this example, a mobile device may actively determine the opportune time period to deliver a notification to a user, a television may implement simplified functionality to wait until a next program change, channel change, or advertisement break to deliver the notification, and a thermostat may show the notification whenever received from the notification distribution system 308; yet, the claimed subject matter is not limited to the foregoing example.

FIGS. 5-8 illustrate exemplary methodologies relating to user interruptibility aware notifications. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 5:
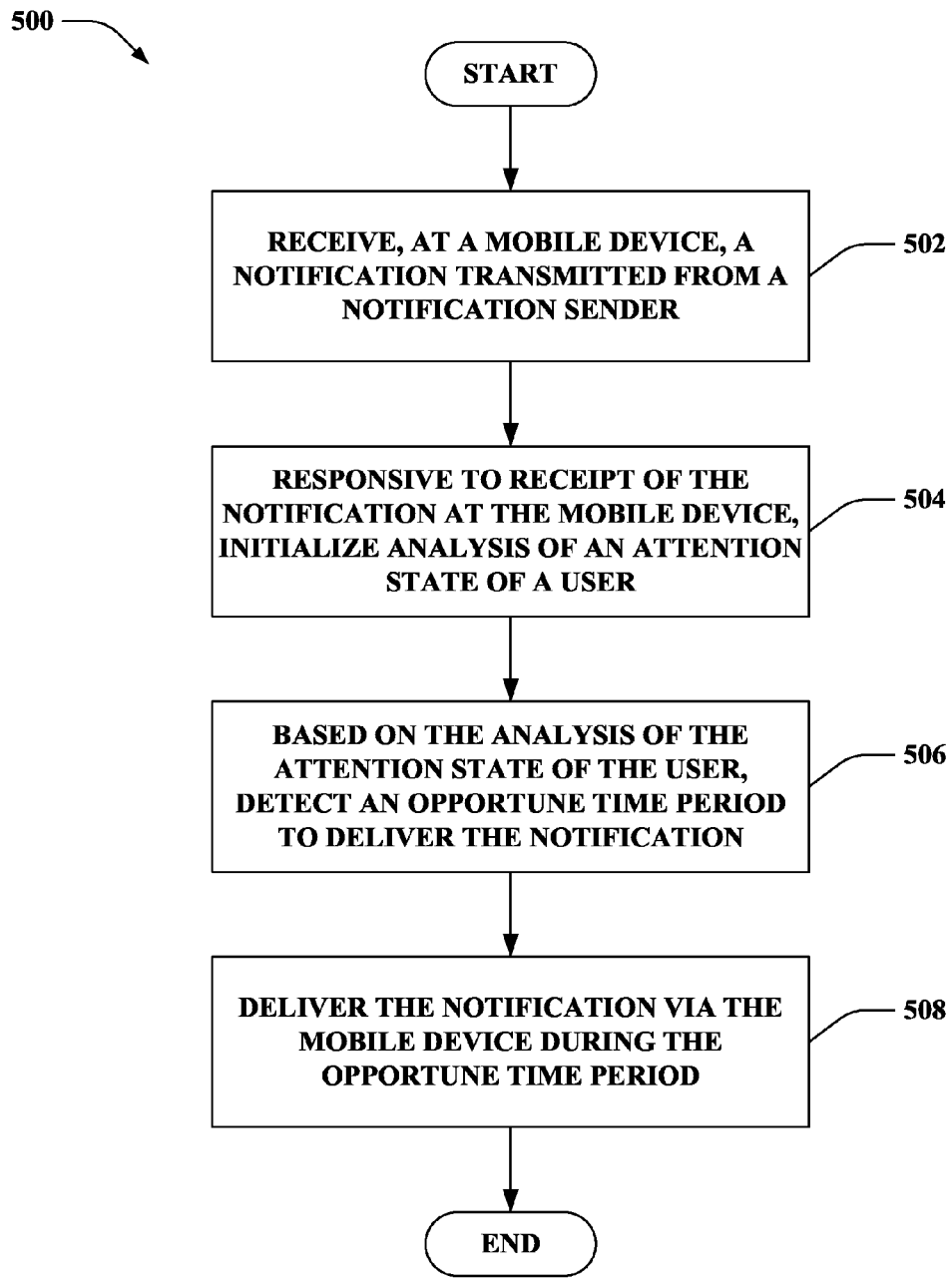
FIG. 5 is a flow diagram that illustrates an exemplary methodology of detecting an opportune time period to deliver a notification via a mobile device.

FIG. 5 illustrates a methodology 500 of detecting an opportune time period to deliver a notification via a mobile device. At 502, a notification transmitted from a notification sender can be received at the mobile device. For instance, the notification can be received from a notification distribution system. At 504, responsive to receipt of the notification at the mobile device, analysis of an attention state of the user can be initialized. At 506, based on the analysis of the attention state of the user, an opportune time period to deliver the notification can be detected. The opportune time period can be during a breakpoint or an influential context. The breakpoint is when the user has switched between tasks and lacks engagement with the tasks. Moreover, the influential context is a particular context in which the user is available to attend to the notification. At 508, the notification can be delivered via the mobile device during the opportune time period.

Figure 6:
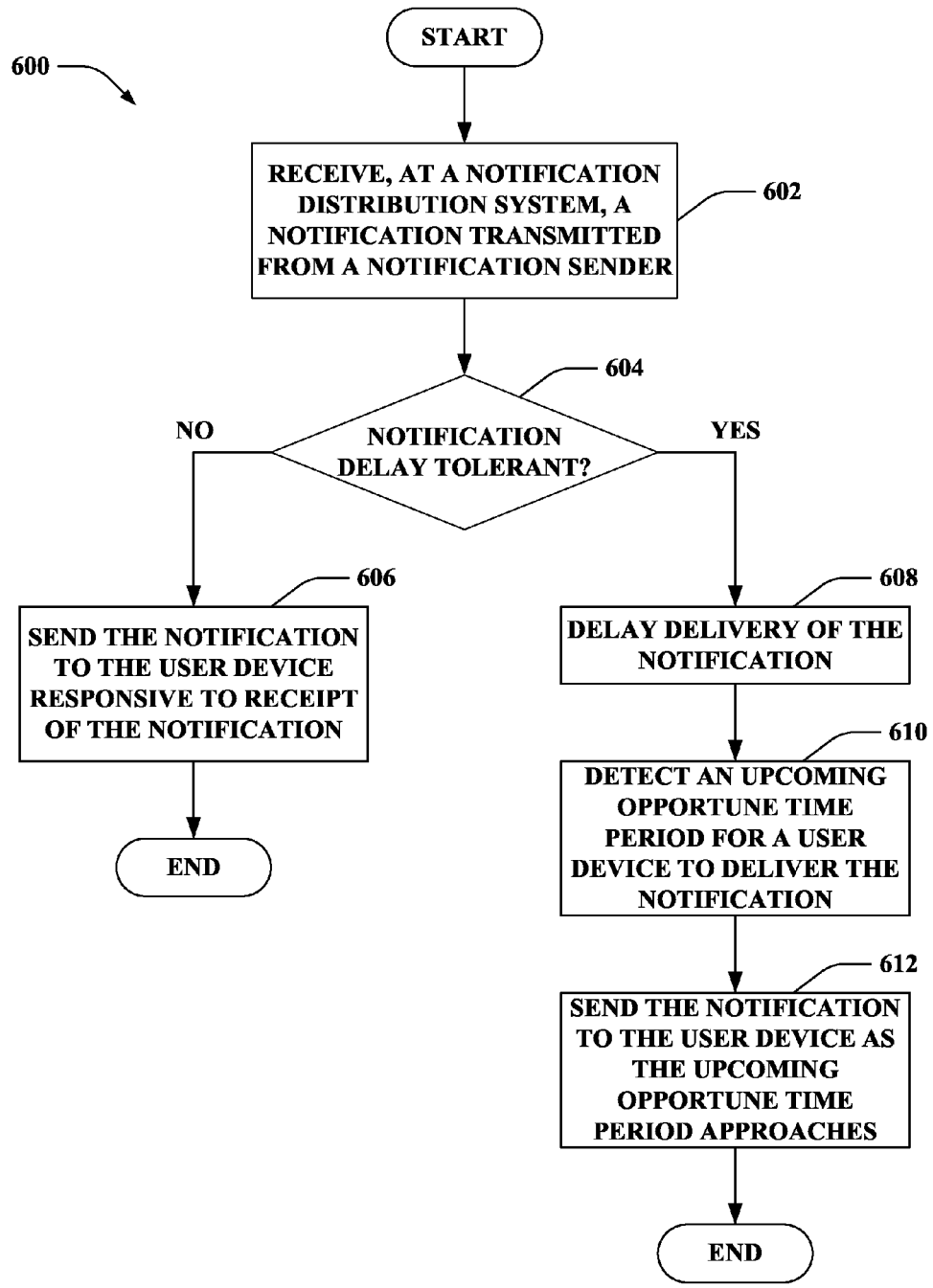
FIG. 6 is a flow diagram that illustrates an exemplary methodology of sending a notification to a user device for delivery to a user.

Referring to FIG. 6, illustrated is a methodology 600 of sending a notification to a user device for delivery to a user. At 602, a notification transmitted from a notification sender can be received at a notification distribution system. At 604, whether the notification is delay tolerant can be determined. If the notification is determined to not be delay tolerant at 604, then the methodology 600 can continue to 606. At 606, the notification can be sent to the user device responsive to receipt of the notification.

Alternatively, if the notification is determined to be delay tolerant at 604, the methodology 600 can continue to 608. At 608, delivery of the notification can be delayed. At 610, an upcoming opportune time period for a user device to deliver the notification can be detected. The upcoming opportune time period can be during a breakpoint or an influential context. According to an example, the notification distribution system can determine the upcoming opportune time period without connecting to the user device. Following this example, the notification distribution system can obtain data from online services to determine if the opportune time period is likely to be upcoming. The data from the online services, for instance, can pertain to a user's engagement with such online services, last known location, calendar and meeting schedule, and so forth. Additionally or alternatively, the user's history and past actions responsive to receipt of notifications can be used to determine if the opportune time period is likely to be upcoming. At 612, the notification can be sent to the user device as the upcoming opportune time period approaches. Accordingly, delaying delivery of the notification to the user device until the upcoming opportune time period approaches can delay initiation of user state analysis on the user device, which can allow for conservation of resources of the user device (e.g., battery life, processor cycles, etc.).

Figure 7:
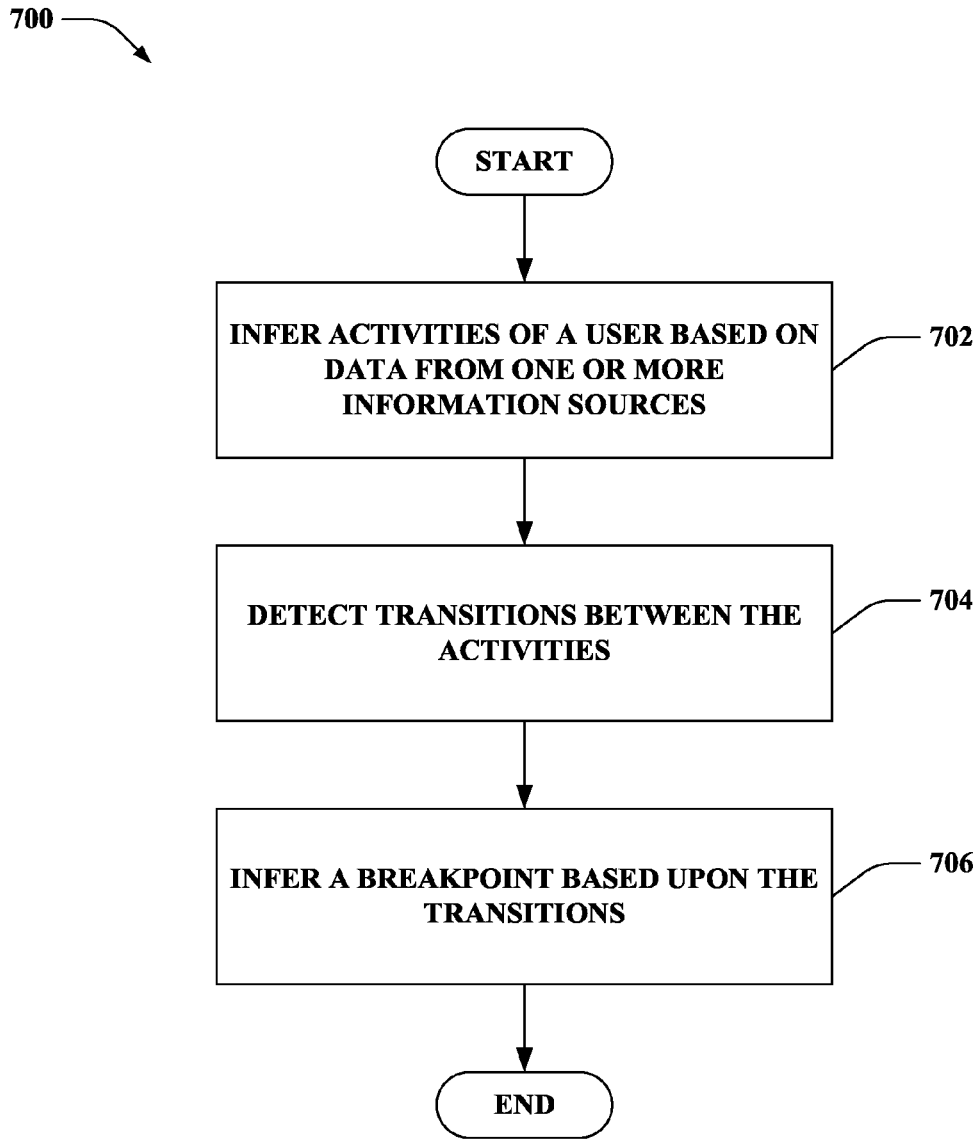
FIG. 7 is a flow diagram that illustrates an exemplary methodology of detecting a breakpoint.

Turning to FIG. 7, illustrated is a methodology 700 of detecting a breakpoint. At 702, activities of a user can be inferred based on data from one or more information sources. At 704, transitions between the activities can be detected. At 706, a breakpoint can be inferred based upon the transitions. The breakpoint can be inferred, for example, by applying a low pass filter to the transitions to suppress rapid transitions and generate a smoothed sequence of transitions. Moreover, the breakpoint can be selected from the smoothed sequence of transitions based upon a previously learned set of transition sequences that correspond to breakpoints.

The methodology 700, for example, can be executed by a user device (e.g., the mobile device 200, the user device 310, the user devices 402-406, etc.). Moreover, according to various examples, it is contemplated that a notification distribution system (e.g., the notification distribution system 308) can predict the breakpoint (e.g., depending upon the data from the one or more information sources available to the notification distribution system); yet, the claimed subject matter is not so limited.

Figure 8:
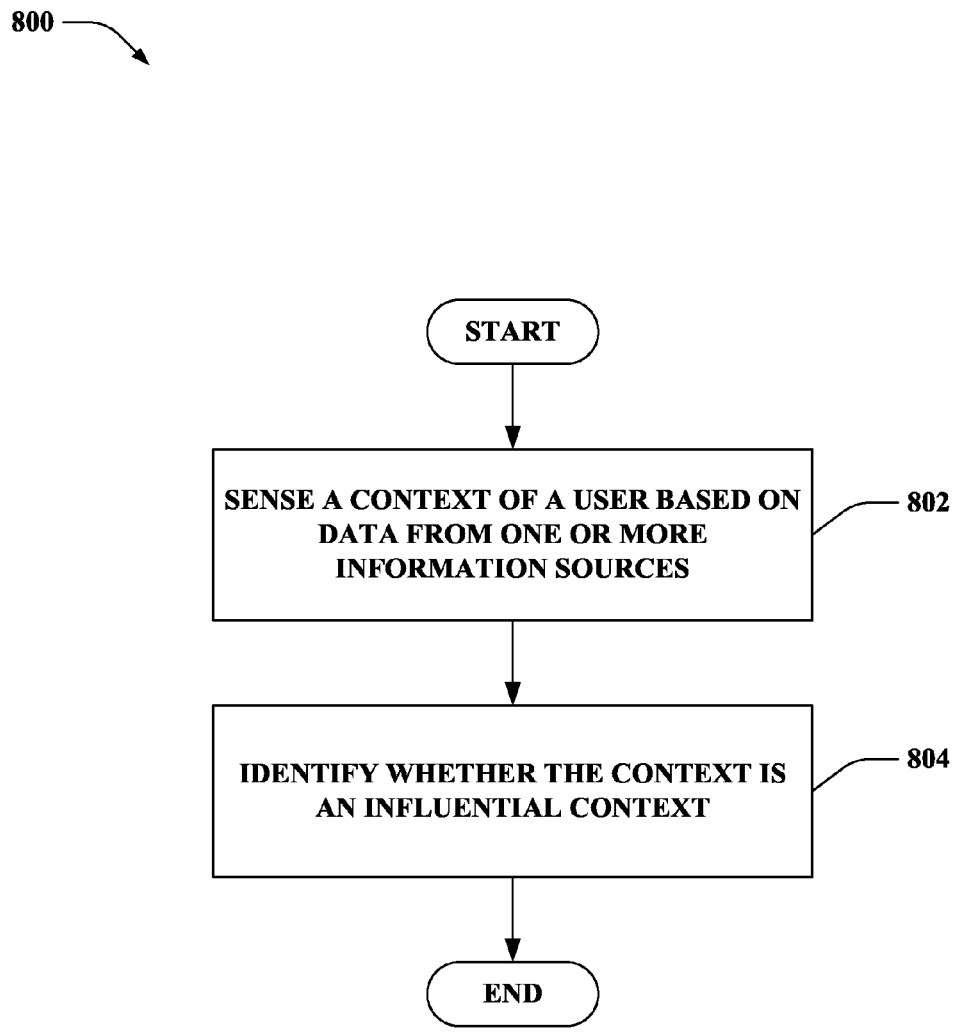
FIG. 8 is a flow diagram that illustrates an exemplary methodology of detecting an influential context.

With reference to FIG. 8, illustrated is a methodology 800 of detecting an influential context. At 802, a context of a user can be sensed based on data from one or more information sources. At 804, whether the context is an influential context can be identified. For instance, identification concerning whether the context is an influential context can be based on preferences collected over a set of training users, preferences of the user learned through behavior monitoring at run time based at least in part on history data that comprises data pertaining to actions of the user responsive to previously received notifications, rules included in a lookup table, a combination thereof, and the like.

The methodology 800, for example, can be executed by a user device (e.g., the mobile device 200, the user device 310, the user devices 402-406, etc.). According to another example, the methodology 800 can be executed by a notification distribution system (e.g., the notification distribution system 308); following this example, the notification distribution system can execute the methodology 800 depending upon the data from the one or more information sources available to the notification distribution system.

Figure 9:
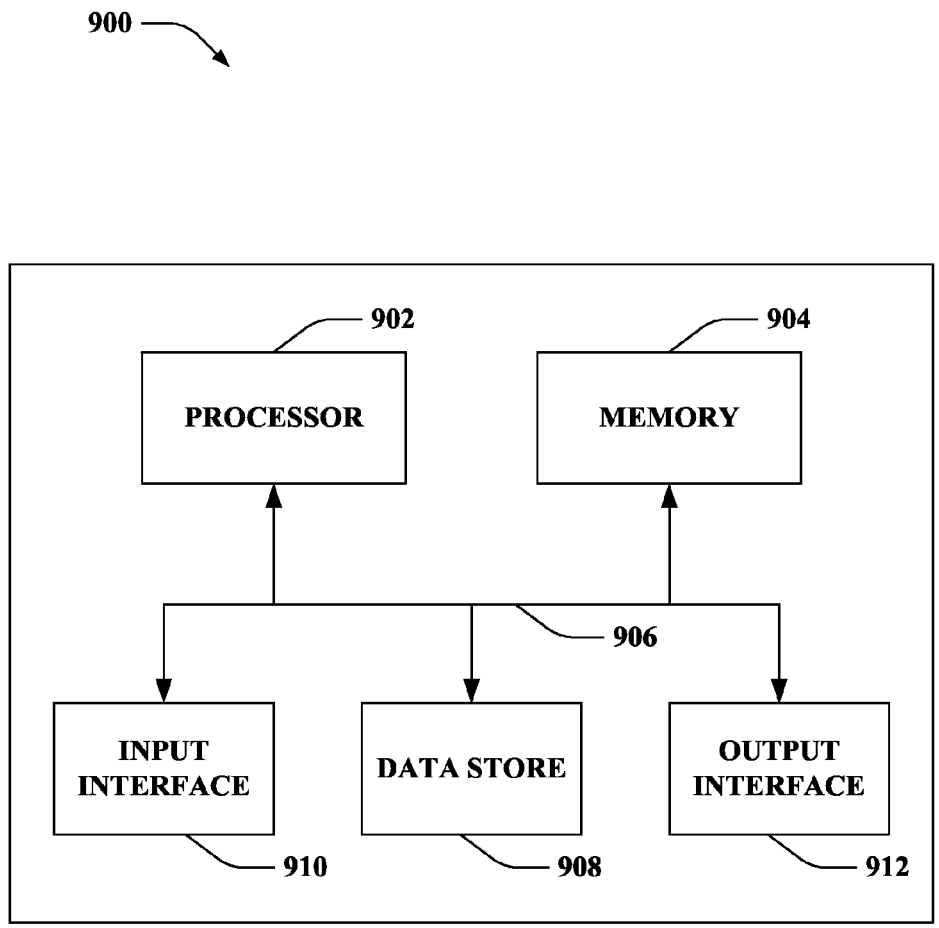
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system that detects an opportune time period to deliver a notification. By way of another example, the computing device 900 can be used in a system that receives a notification from a notification sender and sends the notification to a user device (e.g., as an upcoming opportune time period approaches). The computing device 900, for instance, can be the mobile device 200 of FIG. 2, the notification distribution system 308 of FIG. 3, the user device 310 of FIG. 3, or one of the user devices 402-406 of FIG. 4. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store a notification and so forth.

The computing device 900 additionally includes a data store 908 that is accessible by the processor 902 by way of the system bus 906. The data store 908 may include executable instructions, a notification, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of detecting an opportune time period to deliver a notification via a mobile device, comprising:
   receiving, at the mobile device, the notification transmitted from a notification sender;
   responsive to receipt of the notification at the mobile device, initializing analysis of an attention state of a user by the mobile device, wherein the analysis of the attention state of the user is performed by the mobile device subsequent to the receipt of the notification at the mobile device;
   based on the analysis of the attention state of the user, detecting the opportune time period to deliver the notification, wherein the opportune time period to deliver the notification is detected by the mobile device subsequent to the receipt of the notification at the mobile device, wherein the opportune time period is during one of a breakpoint or an influential context, wherein the breakpoint is when the user has switched between tasks and lacks engagement with the tasks, and wherein the influential context is a particular context in which the user is available to attend to the notification; and
   delivering the notification via the mobile device during the opportune time period.

2. The method of claim 1, further comprising detecting the breakpoint based on the analysis of the attention state of the user, wherein detecting the breakpoint further comprises:
   inferring activities of the user based on data from one or more information sources;
   detecting transitions between the activities; and
   inferring the breakpoint based upon the transitions.

3. The method of claim 2, wherein inferring the breakpoint based upon the transitions further comprises:
   applying a low pass filter to the transitions to suppress rapid transitions and generate a smoothed sequence of transitions; and
   selecting the breakpoint from the smoothed sequence of transitions based upon a previously learned set of transition sequences that correspond to breakpoints.

4. The method of claim 1, further comprising detecting the influential context based on the analysis of the attention state of the user, wherein detecting the influential context further comprises:
   sensing a context of the user based on data from one or more information sources; and
   identifying whether the context is the influential context based upon one or more of preferences collected over a set of training users, preferences of the user learned through behavior monitoring at run time based at least in part on history data that comprises data pertaining to actions of the user responsive to previously received notifications, or rules comprised in a lookup table.

5. The method of claim 1, wherein the analysis of the attention state of the user further comprises evaluating data from an online service.

6. The method of claim 1, wherein the analysis of the attention state of the user further comprises evaluating data from a sensor of the mobile device, the sensor of the mobile device comprises one or more of a microphone of the mobile device, an accelerometer of the mobile device, a gyroscope of the mobile device, a camera of the mobile device, or a location detection component of the mobile device.

7. The method of claim 1, wherein the analysis of the attention state of the user further comprises evaluating data from one or more information sources, the data from the one or more information sources further comprises at least one of data related to usage of the mobile device or data related to usage of a software application.

8. The method of claim 1, wherein the analysis of the attention state of the user further comprises evaluating data from at least one disparate user device.

9. The method of claim 1, further comprising:
   determining a delay bound for delivery of the notification upon receiving the notification at the mobile device; and
   delivering the notification via the mobile device upon expiration of the delay bound for the delivery of the notification regardless whether during the opportune time period.

10. The method of claim 1, further comprising:
    matching the notification to the opportune time period based upon a characteristic of the notification, wherein the characteristic of the notification comprises at least one of content of the notification or a subject of the notification;
    wherein the notification is delivered during the opportune time period to which the notification is matched.

11. The method of claim 1, wherein the notification is received from a notification distribution system, and wherein the notification distribution system received the notification from the notification sender.

12. The method of claim 11, wherein the notification is delayed by the notification distribution system, and wherein the notification is received from the notification distribution system as the opportune time period approaches.

13. The method of claim 1, comprising:
receiving, at the mobile device, coarse-grained user state information prior to the receipt of the notification at the mobile device;
wherein the analysis of the attention state of the user performed by the mobile device subsequent to the receipt of the notification is based at least in part on the coarse-grained user state information received prior to the receipt of the notification at the mobile device.

14. A notification distribution system, comprising:
at least one processor; and
memory that comprises computer-executable instructions that, when executed by the at least one processor, cause the at least one processor to perform acts including:
receiving a notification transmitted from a notification sender at the notification distribution system, wherein the notification is for a user;
determining whether the notification is delay tolerant, wherein sending the notification from the notification distribution system is delayed if the notification is determined to be delay tolerant;
choosing a user device from a set of user devices based on predicted usages of the user devices in the set;
detecting, at the notification distribution system, an upcoming opportune time period for the user device to deliver the notification, wherein the upcoming opportune time period is during one of a breakpoint or an influential context, wherein the breakpoint is when the user has switched between tasks and lacks engagement with the tasks, and wherein the influential context is a particular context in which the user is available to attend to the notification; and
sending the notification to the user device from the notification distribution system as the upcoming opportune time period approaches.

15. The notification distribution system of claim 14, the memory further comprising computer-executable instructions that, when executed by the at least one processor, cause the at least one processor to perform acts including:
sending the notification to the user device responsive to receipt of the notification at least one of:
if the notification is determined to not be delay tolerant; or
if data for detecting the upcoming opportune time period for the user device to deliver the notification is lacking.

16. The notification distribution system of claim 14, wherein the user device is one of a mobile device, a video game console, a television, a computing device, a household appliance, or a home automation device.

17. The notification distribution system of claim 14, wherein the upcoming opportune time period for the user device to deliver the notification is detected based on data from one or more information sources, wherein the data from the one or more information sources comprises at least data from an online service.

18. The notification distribution system of claim 17, the memory further comprising computer-executable instructions that, when executed by the at least one processor, cause the at least one processor to perform acts including:
sensing a context of the user based on the data from the one or more information sources; and
identifying whether the context is the influential context based upon one or more of preferences collected over a set of training users, preferences of the user learned through behavior monitoring at run time based at least in part on history data that comprises data pertaining to actions of the user responsive to previously received notifications, or rules comprised in a lookup table.

19. The notification distribution system of claim 17, the memory further comprising computer-executable instructions that, when executed by the at least one processor, cause the at least one processor to perform acts including:
predicting the breakpoint based on data from one or more information sources.

20. A computer-readable storage medium including computer-executable instructions that, when executed by a processor, cause the processor to perform acts including:
receiving, at a mobile device, a notification transmitted from a notification sender;
responsive to receipt of the notification at the mobile device, initializing analysis of an attention state of a user;
based on the analysis of the attention state of the user, at least one of:
detecting a breakpoint, wherein the breakpoint is when the user has switched between tasks and lacks engagement with the tasks; or
detecting an influential context, wherein the influential context is a particular context in which the user is available to attend to the notification;
detecting the opportune time period to deliver the notification, wherein the opportune time period is during one of the breakpoint or the influential context, wherein the opportune time period to deliver the notification is detected subsequent to the receipt of the notification at the mobile device; and
delivering the notification via the mobile device during the opportune time period.

* * * * *